(12) United States Patent
Jabado et al.

(10) Patent No.: US 8,158,704 B2
(45) Date of Patent: Apr. 17, 2012

(54) POWDER FOR COLD SPRAYING PROCESSES

(75) Inventors: Rene Jabado, Berlin (DE); Jens Dahl Jensen, Berlin (DE); Ursus Krüger, Berlin (DE); Daniel Körtvelyessy, Berlin (DE); Volkmar Lüthen, Berlin (DE); Ralph Reiche, Berlin (DE); Michael Rindler, Schöneiche (DE); Raymond Ullrich, Schönwalde (DE)

(73) Assignee: Siemens Aktiengesellschaft, Munich (DE)

( * ) Notice: Subject to any disclaimer, the term of this patent is extended or adjusted under 35 U.S.C. 154(b) by 313 days.

(21) Appl. No.: 12/442,576

(22) PCT Filed: Sep. 27, 2007

(86) PCT No.: PCT/EP2007/060277
§ 371 (c)(1),
(2), (4) Date: Aug. 3, 2009

(87) PCT Pub. No.: WO2008/037775
PCT Pub. Date: Apr. 3, 2008

(65) Prior Publication Data
US 2009/0306289 A1    Dec. 10, 2009

(30) Foreign Application Priority Data
Sep. 28, 2006  (DE) .................. 10-2006-047-103

(51) Int. Cl.
*C08K 3/08* (2006.01)

(52) U.S. Cl. ..... 524/406; 524/437; 524/441; 106/286.2; 977/754; 501/1

(58) Field of Classification Search .............. 524/612, 524/406, 437, 441; 106/286.2; 977/754; 501/1
See application file for complete search history.

(56) References Cited

U.S. PATENT DOCUMENTS

| 5,712,050 A * | 1/1998 | Goldman et al. ............ 428/680 |
| 6,103,379 A | 8/2000 | Bamnolker et al. |
| 7,160,613 B2 * | 1/2007 | Bawendi et al. ............ 428/403 |
| 2005/0158723 A1 | 7/2005 | Bibette et al. |
| 2006/0019098 A1 | 1/2006 | Bawendi et al. |
| 2006/0090593 A1 * | 5/2006 | Liu ................................. 75/252 |

FOREIGN PATENT DOCUMENTS

| DE | 10131173 A1 | 1/2003 |
| DE | 102005047688 B3 | 11/2006 |
| EP | 1164108 A1 | 12/2001 |
| EP | 1548134 A2 | 6/2005 |
| JP | 2006063160 A | 3/2006 |
| WO | WO 03100109 A1 | 12/2003 |
| WO | WO 2006020294 A2 | 2/2006 |

OTHER PUBLICATIONS

R.S. Lima et al.; "Microstructural characteristics of cold-sprayed nanostructured WC-Co coatings"; Thin Solid Films 416 pp. 129-135 www.elsevier.com/locate/tsf; Others; 2002; US.
L. Ajdelsztajn et al.; "Cold Spray Deposition of Nanocrystalline Aluminium Alloys"; Metallurgical and Materials Transactions A vol. 36A, pp. 657-666; Others; 2005.
Chen Tsung-Yuan et al., Journal of the American Ceramic Society Jan. 1998 Bd. 81, Nr. 1; Magazine; 1998;.
Bogue, Robert, Sensor Review 2005, Bd. 25, Nr. 4, Seiten 249-251; Book; 2005;.
R.S. Lima et al.; "Microstructural characteristics of cold-sprayed nanostructured WC-Co coatings"; Thin Solid Films 416 pp. 129-135 www.elseviercom/locate/tsf; Others; 2002; US.
L. Ajdelsztajn et al.; "Cold Spray Deposition of Nanocrystalline Aluminium Alloys"; Metallurgical and Materials Transactions A vol. 36A, pp. 657-666: Others; 2005.
Chen Tsung-Yuan et al., Journal of the American Ceramic Society Jan. 1998 Bd. 81, Nr. 1; Magazine; 1998.
Bogue, Robert, Sensor Review 2005, Bd. 25, Nr. 4, Seiten 249-251; Book; 2005.

* cited by examiner

*Primary Examiner* — Milton I Cano
*Assistant Examiner* — Wenwen Cai
(74) *Attorney, Agent, or Firm* — King & Spalding L.L.P.

(57) ABSTRACT

A powder can be produced by immersing microparticles (2) in a first solution (4) which contains coupling molecules (5), and then in a second solution (10) which contains the nanoparticles (12), thereby producing microparticles (2) with nanoparticles (12) attached thereto. The particles form powder particles (14) which allow nanoparticles (12) that are smaller than approximately 5 [mu] to be applied to a component by cold gas spraying.

6 Claims, 1 Drawing Sheet

POWDER FOR COLD SPRAYING PROCESSES

CROSS-REFERENCE TO RELATED APPLICATIONS

This application is a United States national phase filing under U.S.C. §371 of International Application No. PCT/EP2007/060277, filed Sep. 27, 2007 which claims priority to German Patent Application No. 10 2006 047 103.2, filed Sep. 28, 2006. The complete disclosure of the above-identified application is hereby fully incorporated herein by reference.

TECHNICAL FIELD

The invention relates to a powder for use in a cold spraying process.

BACKGROUND

The deposition of particles by means of cold spraying processes, for example on turbine blades, has to date only been possible with particles larger than approximately 5 μm. This is due to the momentum transfer properties of the particles onto the surface. For various reasons, however, the use of cold spraying processes to spray nanoparticles is of interest.

In order to make this possible, it has been proposed to provide nanoparticles with shells in order to increase their size and mass with a view to achieving suitable momentum transfer properties. Particles which have a nanoparticle as the core and are surrounded by a shell or capsule are known, for example, from DE 101 31 173 A1, even if the core-shell particles described therein have dimensions of less than 1 μm.

As described, for example, in EP 1 548 134 A2, the nanoparticles may be produced by repeated fracture of microparticles during a milling process.

US 2005/0158723 A1 discloses irreversibly colloidal, i.e. finely distributed, chains with recognition sites. The aim of this is to provide a new type of tool for diagnosing and/or preparing an identification analysis or assay of species in a liquid sample.

The document illustrates the assembly of colloidal particles in the form of one or more chains, which are characterized in that they have an irreversible structure and have at least one recognition site for a species other than the ligands which are associated with the linear arrangement of the particles. In accordance with this document, the colloidal chains may have a relatively rigid, semirigid or flexible structure.

SUMMARY

According to various embodiments, a powder for a cold spraying process can be provided which makes it possible to cold spray particles smaller than approximately 5 μm.

According to further embodiments a process for producing such a powder can be provided.

According to an embodiment, a powder for cold spraying processes may comprise microparticles, nanoparticles and coupling molecules wherein nanoparticles are bonded to a microparticle by means of at least one coupling molecule.

According to a further embodiment, the microparticles can be each surrounded by a shell, which is formed by a number of nanoparticles coupled to the microparticle by means of coupling molecules. According to a further embodiment, the microparticles can be ceramic particles. According to a further embodiment, the microparticles can be MCrAlX particles or components thereof. According to a further embodiment, the coupling molecules can be polymers. According to a further embodiment, the coupling molecules can be polar molecules. According to a further embodiment, the coupling molecules can be dendrimers with one unbranched end and one branched end, a first functional group matched to the microparticles and a second functional group matched to the nanoparticles can be present, and the first functional group can be arranged at the unbranched end and the second functional group is arranged at the branched end of a dendrimer.

According to another embodiment, a process for producing such a powder may comprise the steps of immersing the microparticles in a first solution, which contains the coupling molecules, and then in a second solution, which contains the nanoparticles.

BRIEF DESCRIPTION OF THE DRAWINGS

Further features, properties and advantages of the invention are evident from the following description of exemplary embodiments with reference to the appended figures, in which.

DETAILED DESCRIPTION

As stated above, according to various embodiments, a powder for a cold spraying process may comprise microparticles, nanoparticles and coupling molecules, in which nanoparticles are bonded to a microparticle by means of at least one coupling molecule. In particular, a large number of nanoparticles may be bonded to the microparticle.

Rather than nanoparticles being surrounded by a shell of microparticles, as has occurred previously, nanoparticles can be attached to a microparticle as the carrier by means of specifically developed, organic coupling molecules so that they can be used in a cold spraying process.

The powder particle of microparticles, coupling molecules and nanoparticles has the mass and size required to be sprayed in a cold spraying process. Since the coupling molecules are organic, they are decomposed when they strike the substrate to be coated.

According to a further embodiment, the microparticles are each surrounded by a shell, which is formed by nanoparticles coupled to the microparticle by means of a number of coupling molecules.

In particular, the coupling molecules are polar molecules, i.e. molecules with different functional groups at opposite ends. One functional group of the coupling molecule bonds to the microparticle, for example a ceramic particle, while the functional group at the other end of the coupling molecule bonds to the nanoparticle.

By way of example, the coupling molecules may be polymers (organic molecules), e.g. linear polymers (chains) or dendrimers, that is to say polymers which branch in tree-like fashion, which can be used to couple in each case a plurality of nanoparticles to a microparticle. This makes it possible to obtain a large number of nanoparticles for each microparticle.

By way of example, the microparticles may be ceramic particles, so that thermal barrier coatings (TBC), in particular for turbine components, for example, may therefore be produced by means of cold spraying.

The microparticles may also be MCrAlX particles or components thereof. This makes it possible to produce bonding layers on turbine components in oxidative or corrosive environments. In MCrAlX, M represents at least one element from the group consisting of iron (Fe), cobalt (Co) or nickel (Ni), X represents an active element, for example yttrium (Y) and/or silicon (Si) and/or at least one rare earth element and/or hafnium (Hf). Alloys of this type are known, for example, from EP 0 486 489 B1, EP 0 786 017 B1, EP 0 412 397 B1 or EP 1 306 454 A1, and these are intended to form part of this disclosure with respect to the possible chemical composition of the MCrAlX particles. The nanoparticles may be a component of MCrAlX or may be additives which should fulfill specific tasks.

The small size of the nanoparticles means that the surface properties predominate as a result of the large surface to volume ratio, whereas the volume properties predominate in the case of microparticles which are larger and therefore have a relatively large volume to surface ratio. By way of example, this has an effect on the conductivity or the chemical reactivity of the particles.

According to another embodiment, in a process for producing a powder, the microparticles are immersed in a first solution, which contains the coupling molecules, and then in a second solution, which contains the nanoparticles. This is a simple process for producing a powder according to various embodiments.

Figure 1:
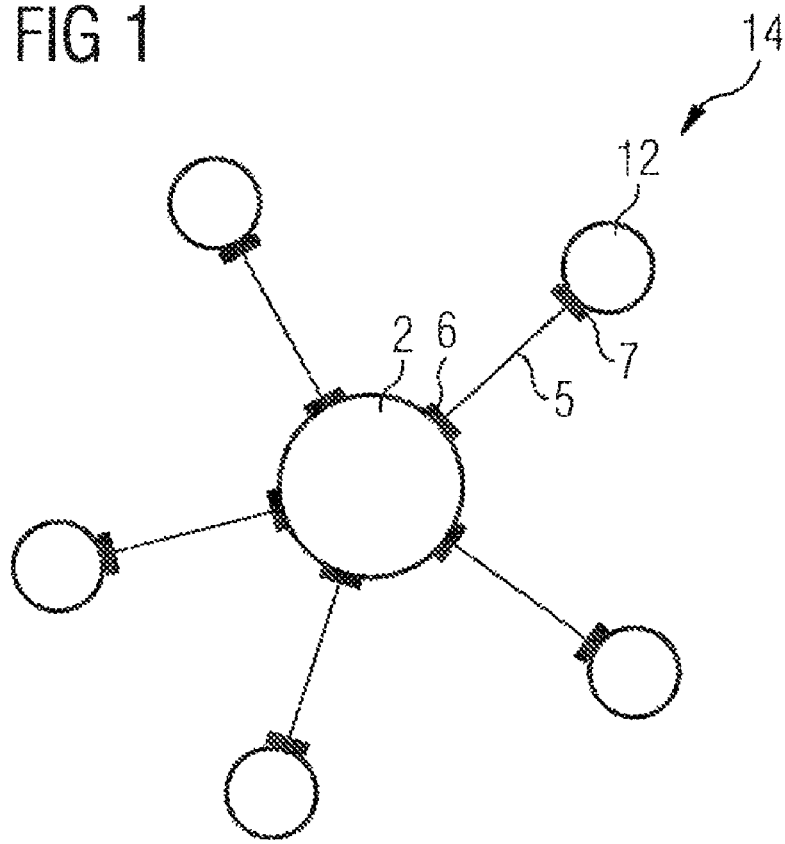
FIG. 1 shows a schematic illustration of a powder particle.

FIG. 1 represents a powder particle 14 consisting of a microparticle 2, coupling molecules 5 and nanoparticles 12.

The microparticle 2 is larger than 1 μm, preferably larger than 5 μm, and may consist, for example, of MCrAlX or an MCrAlX component, for example Co or Ni. However, the microparticle 2 may also consist of other materials, for example ceramics or mixed oxides.

The coupling molecules 5 may be polar molecules, in particular polymers. Polar molecules are molecules with different functional groups 6 and 7 at the two opposite ends. They may be in the form of linear polymers (chains), as illustrated in FIG. 1, or dendrimers, that is to say polymers which branch in tree-like fashion. Owing to their branched structure, dendrimers have a plurality of ends which may bear functional groups. At the "trunk end" of the tree-like structure, they advantageously bear a functional group 6 which bonds to the microparticle, and at the other ends they advantageously bear functional groups 7 which bond to the nanoparticles. In addition, the dendrimers have the property that they are oriented substantially vertically with respect to the surface of a spherical microparticle 2, and their functional groups 7 which bond nanoparticles 12 therefore point outward. Since the first functional group 6 of the coupling molecules 5 is matched to the microparticle 2 and the second functional group 7 is matched to the nanoparticles 12, shells comprising a large number of nanoparticles 12 may therefore be formed around the microparticles 2.

The nanoparticles 12 are smaller than the microparticles 2, preferably smaller than 1 μm. The sizes of the microparticles and nanoparticles are chosen such that the size of the powder particle 14 consisting of microparticles 2, nanoparticles 12 and coupling molecules 5 is at least 5 μm, and therefore it can be sprayed in a cold spraying process. By way of example, if the microparticle 2 consists of nickel or cobalt, the nanoparticles 12 may consist, for example, of one of the elements from the group consisting of aluminum (Al), X, that is to say an active element, for example yttrium (Y) and/or silicon (Si) and/or at least one rare earth element, and/or hafnium (Hf) or of chromium (Cr). They can be produced mechanically, for example by milling. Together with the microparticle 2, the nanoparticles 12 can then form an MCrAlX composition. If an MCrAlX composition is already being used as the microparticle 2, the nanoparticles 12 may be an additive to the MCrAlX composition. The same applies if the microparticles consist of ceramic, for example.

Figure 2:
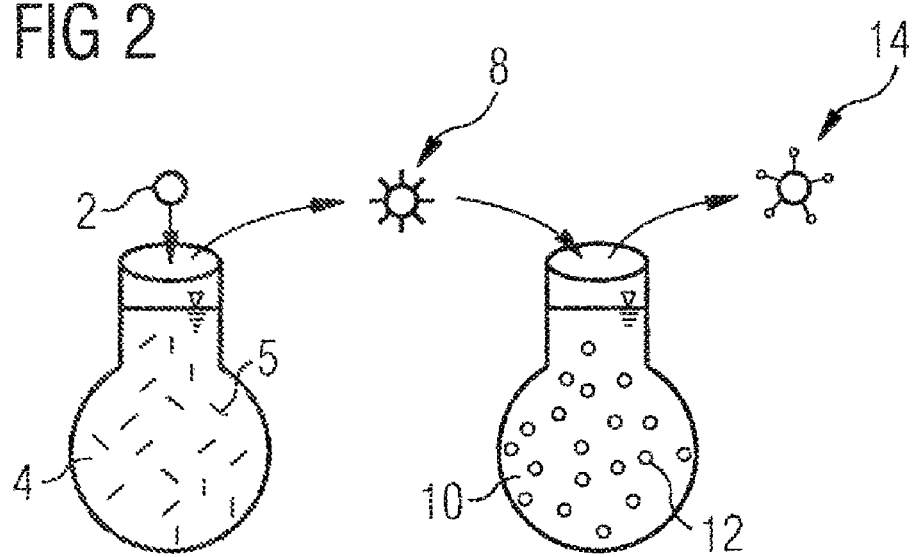
FIG. 2 shows a process for producing a powder particle.

In FIG. 2, powder particles 14 (see FIG. 1) are produced by means of a so-called layer-by-layer (LBL) process.

Microparticles 2 are immersed in a first solution 4 which contains coupling molecules 5. The first functional groups 6 of the coupling molecules 5 settle on the microparticles 2, and complexes 8 are therefore produced.

The complexes 8 are immersed in a second solution 10 which contains nanoparticles 12. Nanoparticles 12 can then be locally bonded to the outwardly pointing second functional groups 7 of the coupling molecules 5 (chains or dendrimers), and powder particles 14 consisting of central microparticles 2, coupling molecules 5 bonded thereto and nanoparticles 12 which have settled thereon are therefore produced.

The invention claimed is:

1. A powder for cold spraying processes which comprises microparticles, nanoparticles and coupling molecules,
    wherein the nanoparticles are bonded to one of the microparticles by at least one coupling molecule, the coupling molecules are dendrimers having a tree-like structure with an unbranched end and a branched end, the unbranched end of the tree-like structure bearing a functional group bonded to the one of microparticles, and the branched end of the tree-like structure bearing functional groups bonded to the nanoparticles,
    wherein the dendrimers are oriented substantially normal with respect to the surface of the one of microparticles such that the functional groups bonded to the nanoparticles extend outward from the microparticle.

2. The powder according to claim 1, wherein the microparticles are each surrounded by a shell, which is formed by a number of nanoparticles coupled to the microparticle by coupling molecules.

3. The powder according to claim 1, wherein the microparticles are ceramic particles.

4. The powder according to claim 1, wherein the microparticles are MCrAlX particles or components thereof.

5. The powder according to claim 1, wherein the coupling molecules are polymers.

6. The powder according to claim 1, wherein the coupling molecules are polar molecules.

* * * * *